Aug. 8, 1967  T. D. JAYNE  3,334,925
SWEAT SOLDERING APPARATUS
Filed Feb. 1, 1965
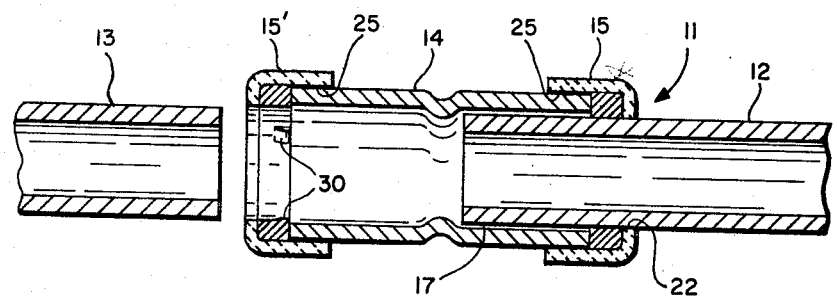
FIG.—1
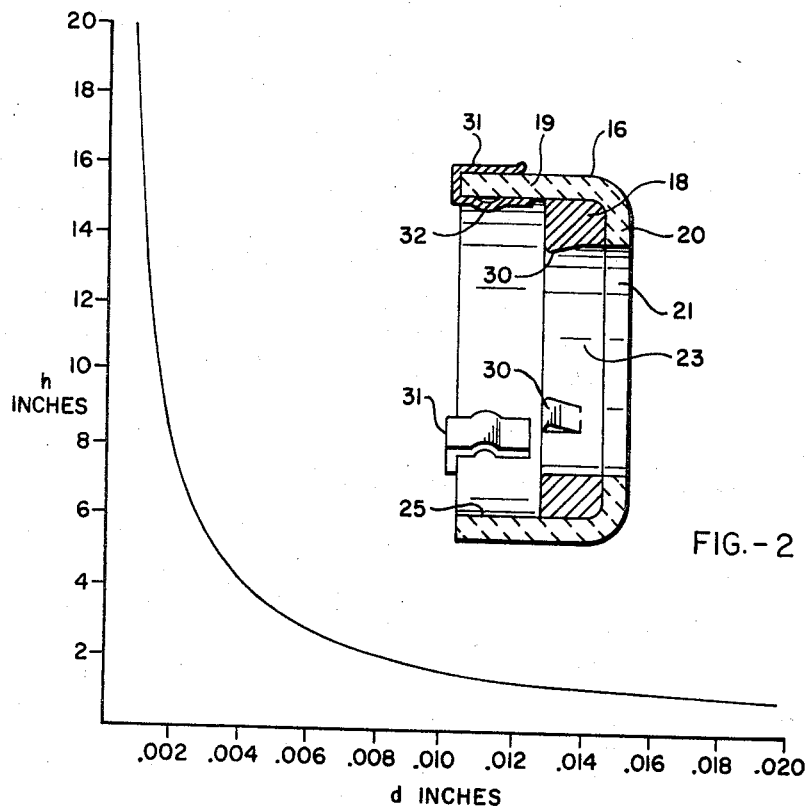
FIG.—2
MAXIMUM HEAD HEIGHT VERSUS CAPILLARY GAP DIMENSION
FOR 50-50 SOFT SOLDER
FIG.—3
INVENTOR.
THEODORE D. JAYNE
BY Watts & Fisher
ATTORNEY

United States Patent Office 3,334,925
Patented Aug. 8, 1967

3,334,925
SWEAT SOLDERING APPARATUS
Theodore D. Jayne, Willoughby, Ohio, assignor, by mesne assignments, to Nibco Inc., Elkhart, Ind., a corporation of Indiana
Filed Feb. 1, 1965, Ser. No. 429,562
5 Claims. (Cl. 285—22)

The present application relates generally to the mechanical connection and hermetic seal of two telescoped members and relates more specifically to devices to facilitate joining tubular members by a process commonly referred to as "sweat soldering."

The "sweat soldering" process is widely used to join copper pipes or tubes and copper fittings which are slipped over end portions of the tube or over a portion of a fitting which is equivalent to a tube. Each fitting has a sleeve, or "solder cup" as it is sometimes termed, which telescopes over an end portion of the tube. Diametrical clearances between the telescoped tubular members, i.e., the sleeve and the tube, range from less than .002 inch to .009 inch or larger. A "sweat joint" is made by causing capillary flow of molten soft solder into the clearance space.

An approved procedure for preparing such sweat joints may consist of the following steps: (1) cut the tube end, ream, deburr, and size as is required; (2) clean the tube end and the solder cup, i.e., the sleeve, with steel wool or the like to obtain a bright metal surface; (3) sparingly apply solder flux to the tube and cup surfaces to be joined; (4) assemble; (5) gauge the proper amount of solder by bending over a length of ⅛ inch solder wire, e.g., 50–50 soft solder, corresponding to the nominal size of the fitting; (6) heat the tube and fitting evenly and place solder at the joint and melt with the heat of the tube and fitting; (7) heat the fitting until the solder is absorbed; and, (8) remove the excess solder with a brush while the solder is plastic, leaving a fillet around the fitting end.

In outline form, there are generally six essential phases of the soldering process for placing solder into the sweat joints.

(1) The solder is melted by bringing it into contact with a surface heated to soldering temperature. Contact of the molten solder is purposely established to both edges defining the joint space. The local region of contact, previously wetted by a flux, develops a small amount of liquid solder.

(2) The melting solder touches the pipe and pipe surfaces through the flux layer and begins to wet the joint surface and a solder puddle is formed at the joint gap. The wetted joint surface may then transfer more heat through this liquid solder puddle to the solid solder. A growing volume of liquid solder forms and either builds away from the contact area to form a "bead," or spreads out in a layer. The spreading solder displaces the flux and the fluxed surface layer.

(3) The globular puddle of solder continues to grow and a column of liquid solder bridges the joint space to make the "capillary contact."

(4) A driving meniscus is formed. Once contact is made and the initial bridge does form, then it generally will not break of its own accord unless the minimum bridge diameter becomes significantly smaller than the bridge span which sometimes happens due to spreading or to the nature of the joint gap opening. The liquid solder "bridge" across the gap tends to enlarge and is fed from the puddle or melting solder. The enlarging solder bridge moves into the joint space and draws more molten solder with it into the joint. The free liquid surfaces of the growing solder are noticeably concave in the joint space. The grown concave bridge at the edge of the joint gap constitutes the driving meniscus for the capillary attraction which causes the solder to flow into the joint. As the bridge growth progresses, a preferred direction of movement and growth tends to develop due to the flux cleaning action, flux pressure, the gap taper, the gap dimension and other causes. The growing concave bridge at the edge of the sweat joint gap constitutes the driving meniscus. A free solder surface between the gap walls becomes an advancing liquid front feeding from the additional solder delivered to the gap entrance.

(5) The capillary forces cause liquid solder to flow into the joint space. The capillary forces may be viewed as that force generated within a liquid and on the walls of its container which is due to liquid adhesion to the walls and to a meniscus surface tension trying to "climb" the walls and pull liquid after it.

(6) The liquid solder flows and fills the gap space to complete the sweat joint.

Most experts have, for many years considered the formation of perfect sweat joints to be a simple matter. With relatively inexperienced persons this is by no means true. Relatively large size tubes and fittings of, for example four inches in diameter, have in recent years found increasing acceptance. With such large size couplings it is quite difficult for even skilled and experienced persons to make consistent and dependable joints in all situations.

Any number of imperfections in the listed phases of the soldering process may exist to produce defects in the completed sweat joint. For example, the solder movement into the joint may be limited by an inadequate supply of new liquid solder, inadequate solder entrance path into the joint gap, inadequate capillary forces, joint gap blockage, or inadequate flux.

Of particular interest here is the elimination, even with relatively unskilled persons, of those imperfections in the sweat joint which are the results of such factors as improper feeding of the solder to the joint, improper application of the heat to the pipe and fitting, and failure to maintain a desired gap by maintaining proper concentricity of the piper and fitting. Most conventional methods of feeding the length of solder wire endwise into the gap, particularly hand feeding, are not able to assure a proper application of solder material completely around the joint at the proper moment during heating. Nor are they able to assure a continuous and unbroken feed to the joint gap. An uneven or discontinuous supply of the solder to the joint gap, as by the failure to melt the solder rapidly enough at the gap edge, does not supply the necessary reservoir of liquid solder.

Lack of concentricity, or more accurately, uneven spacing of the joint walls, provides a non-uniform capillary flow into the joint. If the gap becomes too big in areas, then the solder meniscus force is inadequate to provide an advance against gravity in combination with mild flow resistance from flux. This problem is especially acute in larger fittings, where the height to which solder must flow may be several inches. In these large fittings, the gap over large areas of the joint may allow solder to drain out of the joint rather than climb up into the upper portions of the joint.

Improper or uneven heating of the joint can also result in uneven or discontinuous solder flow. Untimely melting of the solder itself as by improper direct application of the heat source on the solder itself can produce uneven solder flow and even hinder formation of the driving meniscus.

An additional handicap of prior hand feeding methods is that they are unwieldly, particularly where the telescoped tubular members, the heat source, such as a torch, and the solder must all be hand held. This is especially a problem where the work is overhead since the continuous reaching up with both arms can become quite tiresome.

There have been several prior proposals to eliminate hand feeding the solder to a joint. These prior devices generally provide some means for attaching the solder to one of the tubular members so that the solder is held at the joint and flows into the joint space when heated to soldering temperature. For example, in some devices, a ring of solder is provided in an annular groove within the fitting so as to engage the pipe when telescoped into the fitting. Use of these devices is particularly limited, since a fitting must generally be sweat soldered on each of two ends simultaneously. It is very difficult if not impossible, to heat one end without melting the ring of solder in the other end of the fitting. Also, it has been found that the defects due to uneven solder flow are also prevalent in sweat joints made with these prior devices. This is at least partially caused by the annular solder carrying groove itself. The annular groove cannot carry sufficient solder to provide a well filled sweat joint. Uneven heating of the joint invariably causes uneven solder flow. Further, concentricity is often lost as soon as the solder melts.

Other prior proposals have placed an annular ring of solder against the joint gap edge and surrounded the ring of solder with an exothermic material. Here, concentricity is lost as soon as the exothermic material burns, especially if the material burns unevenly. The gases generated during burning of the exothermic material may also cause (a) additional forces against the solder such that it causes uneven solder flow and, (b) an intermixing of heat source gases in the solder. Another disadvantage of these proposals is that the heat from the exothermic material is applied directly to the solder which, as a result, may be prematurely melted. Heat is applied to the tubing only indirectly and proper capillary flow may never occur because the tube is not heated sufficiently.

The present device provides an improved even flow of solder to the joint gap and maintains concentricity of the pipe and fitting until the sweat joint is completed. The present device comprises an annular solder carrier of a heat degradeable material. An annular body of solder is carried by the carrier and is positioned by the carrier against the joint gap edge prior to the application of heat to the pipe and fitting and maintains the annular body of solder at the joint gap edge until the joint surfaces reach soldering temperature. In a preferred form, the solder carrier has insulating properties and shields the solder from the direct application of heat from the heat source. The solder is melted by the joint gap surfaces reaching the proper soldering temperature.

The melted solder provided circumferentially at the joint gap entrance provides a continuous supply of melted solder entirely around the gap. The size of the annular ring of solder can be varied in the device to assure adequate supply of solder for various size and depth fittings. The carrier engages both the fittings and the pipe and maintains a uniform gap spacing throughout the entire sweat soldering process. The heat applied to the joint causes the material of the carrier to change its chemical nature such that after the sweat joint is completed, the carrier may be easily removed from the joint by crushing it or brushing it away with a wire brush.

Accordingly, the objects of the present invention are to provide a new and improved device for soldering a joint and an improved method of forming a sweat joint.

Other objects and a fuller understanding of the invention may be had by referring to the following description and claims taken in conjunction with the accompanying drawings in which:

FIGURE 1 is a sectional view, as seen in longitudinal plane, of the device of the present invention with a tube exploded and positioned to be telescoped into the remainder of the device.

FIGURE 2 is an enlarged, cross sectional view of the solder carrier device of the present invention.

FIGURE 3 is a graph depicting liquid solder head height versus capillary gap dimensions.

Referring now to FIGURE 1, a plumbing assembly having joints to be sweat soldered with the device of the present invention is indicated generally by the reference character 11. The plumbing joint includes tubes or pipes 12, 13 of copper or other suitable metal, a sleeve or fitting 14 of copper or other metal, and solder carriers 15, 16.

The copper pipes 12, 13 and the copper fitting 14 in the form of a sleeve are all conventional standard plumbing pieces. The copper pipe 12 is shown telescoped into one end of the sleeve 14. The copper pipe 13 is shown in exploded relation about to be telescoped into the end of the sleeve 14. A joint gap or space 17 is formed between the pipes 12, 13 and the copper sleeve 14.

Referring to FIGURE 2, the carrier 15 includes an annular container 16 and an annular body of solder material 18. The annular container 16 includes a cylindrical wall portion 19 and an annular end wall portion 20. The annular end wall portion 20 extends radially inward from one end of the cylindrical wall portion 19. The annular wall portion 20 includes an annular surface 21 defining a central circular opening axially co-extensive with the cylindrical wall portion 19. The surface 21 is sized to receive the copper pipes 12, 13 with a slight clearance between them. The slight clearance is preferably just sufficient to provide a capillary space for melted solder.

The body of solder material 18 fills a portion of the annular container 16 contiguous to the annular wall 20 and a part of the cylindrical wall 19. The body of solder material 18 has an inner annular surface 23 which defines a cylindrical opening sized to loosely receive the copper pipes 12, 13. The central opening defined by the inner annular surface 23 is axially co-extensive with the opening 22 defined by the annular surface 21. The solder material may include spaced, tapered projections 30, preferably three or more, which abut the pipe. Since the solder is soft the pipe may be forced through these projections 30 if it is too large and thus intimate contact between the solder and the pipe is assured. The body of solder material 18 may be any conventional soldering material, for example, a 50–50 solder which is 50% lead and 50% tin, or a 95–5 tin-antimony alloy. The solder material may also comprise a silver solder as the present carrier is also useable for silver soldering.

The cylindrical wall portion 19 of the annular container 16 has an internal cylindrical surface 25 which is sized and shaped so as to telescope closely over a portion adjacent one end of the sleeve 14. Preferably, an attachment means is provided to maintain the solder carriers 15, 15' on the sleeve 14 so as to resist removal from the sleeve 14 as by the forces of gravity. In one form of the present invention, this means can be provided by sizing the cylindrical wall portion 19 to fit with a friction fit on the sleeve 14. In other embodiments, the attachment means comprises a crimp in the cylindrical wall portion, or a suitable adhesive material or other attaching device provided between the telescoping parts of the wall portion 18 and the sleeve 14. One such attaching device is a clip 31, FIGURE 3 which frictionally engages the wall portion 19. The clip 31 has a spring projection 32 which yieldably engages the sleeve 14.

In a preferred form of the present invention, the annular container 16 is made of a heat degradeable material. A suitable material for this purpose comprises asbestos paper fiber bonded with a suitable adhesive, for example, a polyvinyl acetate glue. Other suitable materials for this purpose are ceramics including a thermosetting resin, for example, a melamine resin, with a clay and asbestos filler.

These heat degradeable materials prior to the application of heat to them have sufficient strength to withstand breakage from normal handling prior to use and to position the copper pipes 12, 13 in a concentric relation providing a uniform circumferential joint spacing and to maintain such uniform spacing during the sweat soldering process. The container material is described as "heat degradeable" because after heat is applied to it during the soldering process, its chemical composition changes such that it is easily crushed, broken or crumbled and may be removed simply as by brushing it away with a wire brush.

The solder carriers 15, 15' can be provided as separate parts and assembled onto the sleeve 14 and the pipes 12, 13 just prior to the sweat soldering of the joint or they may be provided in conjunction with the sleeve or other fitting 14, for example, as shown in FIGURE 1, the carriers 15, 15' are secured to the sleeve by suitable connections such as an adhesive 26. The sleeve 14 is provided eo a plumber or other user with the carriers 15, 15' attached to its end. The user, then needs only to telescope the ends of the pipes or tubes 12, 13 into the fitting 14 through the solder carriers 15, 15' attached to the sleeve.

The solder carriers 15, 15' are thus collar-like members which hold the annular bodies of solder material 18 in direct contact with the tubes 12, 13 and with the end of the sleeve 14 so that each body of solder material is heated to the soldering temperature by the tube and sleeve primarily. The collar-like carriers have at least three parts abutting a tube and at least three parts abutting a fitting to maintain the tube, fitting and collar in concentric relation. A source of heat, such as a torch, is provided and placed over the joint area. The carrier holds the sleeve and the telescoped tubes in assembled, uniformly spaced relation so that they need not be held which leaves one hand of the user free. The insulating carrier shields the solder material from the direct application of heat and also from entry of gases and other materials during the sweat soldering process. When the joint area is heated to the soldering temperature, each body of solder material in contact with the tubes and sleeve immediately melts and wets the joint edges to form a solder bridge and a driving meniscus. The melting solder flows into each joint space by capillary attraction and fills the joint space. Some of the melting solder also flows into the slight capillary space between each end wall of the carrier and each tube so that a ring of solder appears at each end and indicates that the solder material has melted to fill the joint and that the heat source may be removed. The solder carrier is then easily removed by crushing it or brushing it away as with a wire brush.

The importance of maintaining a uniform gap spacing is illustrated by the graph in FIGURE 3. The graph in FIGURE 3 shows the maximum static height to which a meniscus will hold solder in a capillary such as provided in conventional sweat soldering joint practices. The values given along the ordinate axes represents the joint gap size in inches. The values along the abscissa axes are the maximum static height to which a meniscus will draw the liquid solder in the capillary formed by the joint gap. As is shown by the graph, the smaller joint gaps produce a higher maximum static height. The larger the joint gap, the smaller the height to which the meniscus will hold the solder.

To illustrate the criticality of maintaining a proper and uniform gap dimension between telescoped tubular members, assume that a horizontally disposed four inch copper pipe is to be sweat soldered to a copper fitting. As shown by the graph, the maximum permissible capillary dimension between the pipe and the fitting which will still draw the melted solder to a height of four inches is approximately .004 inch. Thus, if the gap dimension is greater than the .004 then there is a great chance that the solder will not be drawn entirely up around the entire circumference of the telescoped portions of the copper pipe. It is to be appreciated that in current sweat soldering processes, where the one copper pipe may be off center and resting against the lower surface of the fitting, the gap between the pipe and the fitting will vary from nothing at the bottom where they abut to much greater than the .004 inch space necessary to assure proper capillary flow.

The present invention therefore provides an ample supply of solder material circumferentially of the joint gap and touching the edges at the joint gap entrance. Melting of the solder material occurs after the joint surfaces reach the soldering temperature and not before. The solder melts annularly and uniformly provides a continuous circumferential supply of liquid solder to the joint gap entrance. The solder carrier or container holds the fitting and each tube in substantially concentric relation so as to maintain uniform gap spacing throughout the entire sweat soldering process. This maintained uniform spacing and the continuous circumferential supply of liquid solder to the joint gap entrance assures an even flow and uniform advancement of the liquid solder front in the joint space. The uniform joint spacing maintained by the container assures even and complete solder flow even in large size copper pipe.

The container is easily removed after use and leaves a neat and professional looking sweat joint. Defect free sweat joints can be consistantly produced by the present carrier device. Sweat joints produced by the present solder carrier device uniformly have good "creep" strength sweat soldering processes and prior devices. By "creep" it is meant the tendency of the fitting and tube to separate under static or transient load such as water pressure. The creep strength of the sweat joint is almost always the weakest point in a pipe system because the strength of the sweat joint is several times less than the fittings and tubes. The present carrier device is also useable with used fittings and tubes and will consistently produce defect free joints with them.

In summary, the present invention is believed to comprise essentially a solder carrier of a heat degradeable material having a first portion adapted to be attached to the outer of two telescoped tubular members and a second portion adapted to engage the inner of the telescoped tubular members and maintain uniform joint spacing between the tubular members, and a tubular body of solder material carried by the solder carrier and positioned against an end of the outer tubular member at the joint gap edge. Preferably, a slight capillary space is provided between the second portion of the carrier and the inner tubular member. The invention further comprehends a new and improved method of sweat soldering which includes closely shielding the solder material and the joint space from the direct application of the heat source.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:
1. In combination, as an assembly for forming a sweat solder joint, an assembly of components comprising;
   (a) a tubular fitting including a cylindrical, internal surface defining a bore,
   (b) a tubular conduit including a cylindrical surface near one end thereof disposed within said fitting surface in concentric, spaced relationship therewith such that said surfaces define an annular capillary gap therebetween,
   (c) a solder container comprising
      (i) a reduced diameter end portion in telescopic sliding engagement with said tube;
      (ii) an enlarged end portion at the end remote from the reduced diameter portion;
      (iii) said enlarged portion being telescoped over and in sliding engagement with said fitting; and,
      (iv) an intermediate portion connecting the reduced diameter and large diameter portions together in axially aligned relationship such that the container through its sliding engagement with the tube and fitting maintains the two in concentric relationship so as to provide a capillary gap therebetween of substantially uniform radial dimension throughout;
(d) a quantity of solder within said container and connected thereto, and abutting an end of the fitting, at the outward end of the capillary gap, and outward of said tube,
(e) said container being formed of a heat insulating material to insulate said solder from external heat whereby on application of heat
  (i) the container will maintain the tube and fitting in concentric relationship,
  (ii) the container will insulate the solder from direct application of heat and cause the solder to be melted by heat conducted to it by the tube and fitting assuring that the fitting and tube are both of proper temperature to induce good capillary flow, and,
  (iii) the solder when melted will be drawn into the capillary gap by capillary action.

2. The assembly of claim 1 wherein the solder container is constructed of heat degradeable material that maintains its shape and substance but loses substantial strength when once heated to soldering temperatures, thereby facilitating removal.

3. The assembly of claim 2 wherein the solder container is formed of a ceramic material.

4. The method of forming a sweat solder joint between a tube and a fitting with a solder container of heat insulating material having a stepped configuration with a reduced diameter end portion adapted to slidably engage a tube and a larger diameter end portion adapted to slidably engage a fitting, and a quantity of solder in the container, comprising the steps of:

(a) sliding the reduced diameter portion over the tube, the large diameter portion over the fitting, telescoping an end portion of the tube into the fitting so that the container maintains the tube and fitting in concentric relationship with surfaces of the two defining an annular soldering gap of substantially uniform radial dimension therebetween and placing the solder in contact with at least one of the tube and fitting adjacent an end of the fitting;
(b) applying heat to the tube and the fitting while insulating the solder from direct application of heat with the container until heat conducted by the tube and fitting to the solder causes the solder to melt and flow into said gap through capillary forces and terminating the application of heat after the tube and fitting have been brought to a temperature sufficiently high to cause the solder to melt and flow.

5. The method of claim 4 including the step of removing the container after the tube and fitting have cooled.

References Cited
UNITED STATES PATENTS

| | | | |
|---|---|---|---|
| Re. 24,365 | 10/1957 | Klein | 285—287 X |
| 1,722,324 | 7/1929 | Deming | 285—22 X |
| 2,053,808 | 9/1936 | Young | 285—287 X |
| 2,329,956 | 9/1946 | Taylor | 285—287 X |
| 3,221,970 | 12/1965 | Lockshin | 228—56 |

FOREIGN PATENTS 397,898　8/1933　Great Britain.

CARL W. TOMLIN, *Primary Examiner.*

D. W. AROLA, *Assistant Examiner.*